United States Patent [19]

De Feo

[11] Patent Number: 4,672,183
[45] Date of Patent: Jun. 9, 1987

[54] DEVICE FOR READING AND CANCELLING THIN FILM AREOLAE OF MATERIAL HAVING UNIAXIAL, MAGNETIC ANISOTROPY AND DEPOSITED ON CREDIT CARDS OR THE LIKE

[75] Inventor: Paolo De Feo, Naples, Italy

[73] Assignee: I.P.M. Industria Politecnica Meridionale S.p.A., Italy

[21] Appl. No.: 663,127

[22] Filed: Oct. 22, 1984

[51] Int. Cl.$^4$ .............................................. G06K 7/08
[52] U.S. Cl. ....................................... 235/449; 360/2; 365/66
[58] Field of Search .................. 235/449, 450; 365/66; 360/2

[56] References Cited

U.S. PATENT DOCUMENTS

| | | | |
|---|---|---|---|
| 2,926,844 | 3/1960 | Devol | 235/450 |
| 3,290,487 | 12/1966 | Scott | 235/450 |
| 3,423,742 | 1/1969 | Harris | 235/450 |
| 4,158,433 | 6/1979 | Peterson et al. | 235/449 X |

FOREIGN PATENT DOCUMENTS 584734 11/1958 Italy ...................................... 365/66

*Primary Examiner*—David L. Trafton
*Attorney, Agent, or Firm*—Wigman & Cohen

[57] ABSTRACT

Device for reading and cancelling thin film areolae of material having uniaxial, magnetic anisotropy and deposited on credit cards or the like, comprising: (i) at least one head including a reading probe formed by a support member carrying at least an assembly formed by an excitation winding associated to a detection winding, said windings being wound in orthogonal relationship to each other around said support member; and at least a pair of cancellation electrodes assembled at the intersection area of said windings and adapted to provide an electric arc therebetween and to be faced to the areolae of the material to be examined and (ii) circuit means for producing the excitation current and for receiving the response signal representative of the characteristics of the material in the areola under examination, and for effecting a comparison of the phase and the amplitude of said signal with reference signals as well as for detecting eventually the rotation by 180° of the magnetic moment vector by applying to said areola orthogonal magnetic fields having intensities correlated to the characteristics of the material preselected for the areolae.

8 Claims, 2 Drawing Figures

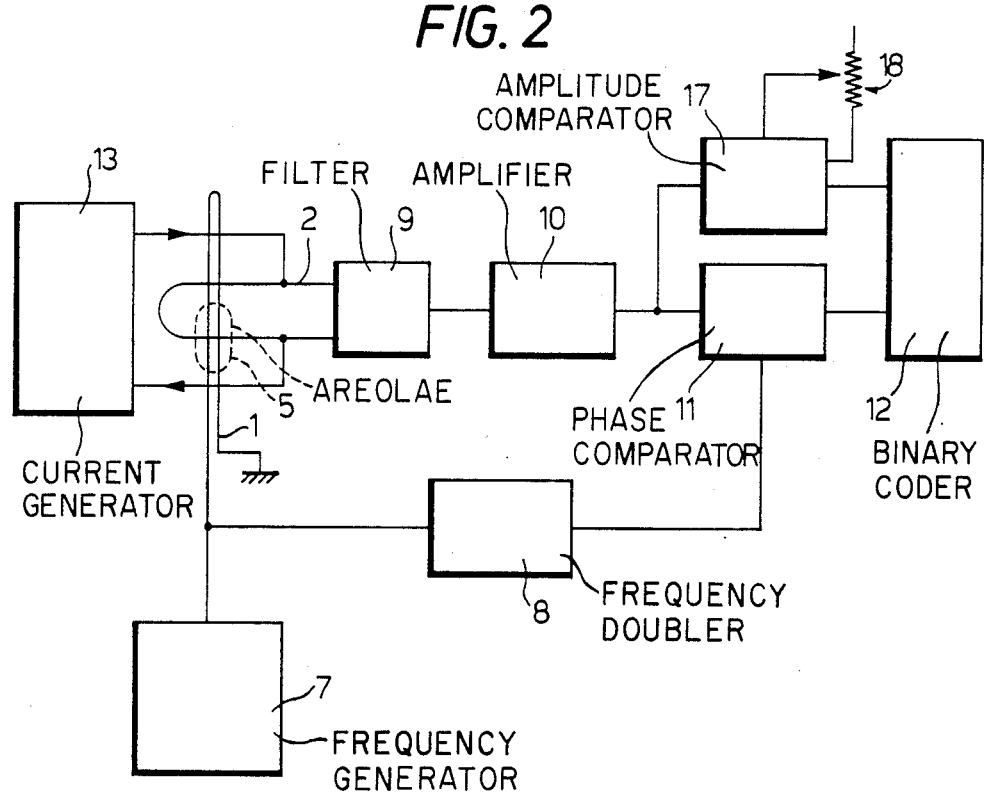

DEVICE FOR READING AND CANCELLING THIN FILM AREOLAE OF MATERIAL HAVING UNIAXIAL, MAGNETIC ANISOTROPY AND DEPOSITED ON CREDIT CARDS OR THE LIKE

FIELD OF THE INVENTION

The present invention relates to a device for reading and cancelling credit cards or the like, on which thin film areolae or small areas are deposited consisting of a material having an uniaxial, magnetic anisotropy.

BACKGROUND OF THE INVENTION

In European Patent Application No. 7930019.0 a laminar support is described and illustrated to provide a credit card or the like having as code and value elements zones or areolae formed by depositing thereon a thin film consisting of ferromagnetic materials or alloys with properties of uniaxial, magnetic anisotropy, i.e. having a rectangular hysteresis loop according to a certain axis parallel to the plane of the thin film and referred to as the easy axis, and a flat or almost null hysteresis loop according to an axis orthogonal to the first one and referred to as the hard axis. This is achieved in a particular environment, e.g. by means of a deposition of a ferromagnetic material or Fe-Ni alloys on a laminar support such as a credit card, an identity card or the like with techniques of electro-deposition or evaporation under hard vacuum and in the presence of a magnetic field tangential to the plane of the support.

The direction of this field will specify the above mentioned easy axis, and the magnetization moment will have only two steady states of orientation according to the two directions of said axis. The film may be deposited on a plurality of zones or areolae, each of them comprising one information unit or bit as a function of both the thickness, and consequently the intensity of the magnetic induction, and the direction of orientation of the easy magnetization axis. In particular, in the specific case of a credit card some areolae can be designed for containing the information relevant to the identification of said credit card, while other areolae are credit or value elements and are designed for progressive cancellation by means of destruction during the services for which the credit card has been provided.

The present invention seeks to provide a device for indentifying some selected characteristics of the material having uniaxial, magnetic anisotropy and deposited on the areolae or zones of a credit card or the like, and eventually for cancelling at least a portion of said areolae.

In this invention a thin film of the above mentioned Fe-Ni alloys having uniaxial, magnetic anisotropy exhibits physical properties such that, if it is subjected to a field produced by a conductor passing a current of frequency $f_o$ and lying on a plane parallel to that of the thin film and oriented according to the easy magnetization axis, it induces in a second conductor lying on the same plane and orthogonal to the first conductor a signal of frequency $2f_o$.

This invention utilizes this physical property to provide a non-volatile reading/writing memory, in which the information unit or bit is given by the direction of orientation of the magnetic moment vector of the areola concerned. In such an application the excitation and detection conductors forming the reading/writing device are lying on the same support as the thin film and are integral therewith, their distance from the plane of the thin film being only some microns.

The end result is that of determining only the direction of the magnetic moment vector regardless of an evaluation of the physical quantity concerned.

SUMMARY OF THE INVENTION

The present invention seeks to provide a device which is separated from the laminar support of the thin film forming the credit card, the identification card or the like, and permits the excitation and the detection even at a distance of some tenths of millimeter in order to establish the presence or the absence of a thin film in the areolae under examination composed of a material having properties of uniaxial, magnetic anisotropy. If this thin film is present, the device is able to compare some parameters of the thin film with preset reference values. This is achieved by checking the relationship between the excitation and the detection signals because a distinction is possible between areolae covered by films having different physical parameters due to a different manufacturing process, even if they have properties of uniaxial, magnetic anisotropy. This allows the identification of credit cards or identity cards of different or fraudulent origin.

Furthermore, the present invention is advantageous because it integrates on the same support performing the reading operation a device of the eventual cancellation of the areola under examination.

BRIEF DESCRIPTION OF THE DRAWINGS

The present invention will be described herebelow into further detail with reference to a preferred embodiment and the annexed drawings, wherein:

FIG. 2 is a block diagram of the excitation and detection circuit of the device.

DETAILED DESCRIPTION OF THE DRAWINGS

Figure 1:
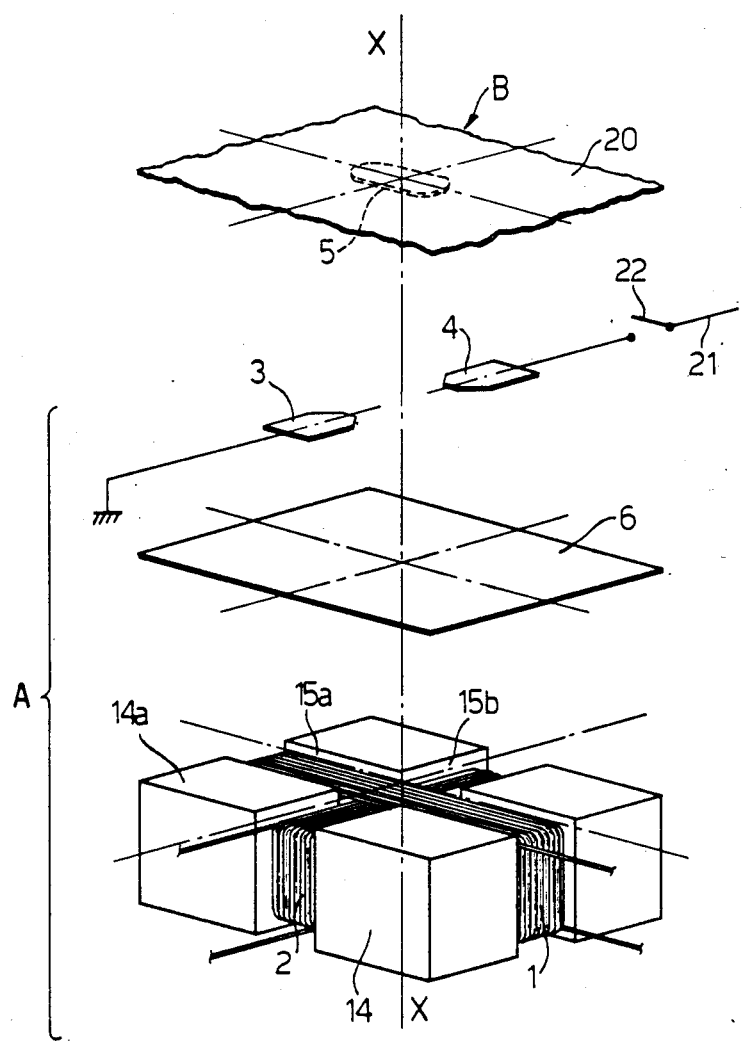
FIG. 1 is a perspective, exploded, schematic view of the basic members of the reading and cancellation head of the device and the associated credit card.

The head schematically illustrated in the perspective, exploded view of FIG. 1 and generally designated with A comprises a reading probe consisting of a support 14 having a flat surface 14a at least at its portion facing a member generally designated with B and formed by a laminar support 20 (only partially shown) on which areolae 5 are provided, only one of which is shown in FIG. 1, and formed by the deposition of a material having characteristics of uniaxial, magnetic anisotropy as already mentioned. On the flat surface 14a two slots 15a, 15b are formed which are essentially coplanar and orthogonal to each other and are designed to house the respective turns of two windings located around said support 14. The first winding 1 formed by one or more turns is the excitation unit in which a current of frequency $f_o$ is passed, the second winding 2 formed by one or more turns being the detection unit and the axis X—X being the detection system axis which is perpendicular to the surface 14a and passes through the intersection point of the windings 1 and 2. The detection unit 2 detects the eventual presence of a signal of frequency $2f_o$ when the head A is faced by an areola 5 of the laminar member B so that the axis X—X passes essentially through the centre of said areola 5, in case the latter is covered by a film of a material having given characteristics of uniaxial, magnetic anisotropy and when the easy magnetization axis is oriented in the same direction of the conductors of the excitation winding 1 located in the slots 15a as above mentioned. The cancellation unit is formed by a pair of electrodes 3, 4 located symmetrically with respect to the axis X—X above the surface 14a and spaced apart from each other by a distance such as to be essentially tangential in diametrically opposed points to the peripheral edge of the areola 5 under examination which is to be cancelled. By the application to the electrodes 3 and 4 of a sufficient electric voltage supplied by a circuit 21 controlled by switch 22, an arc will be produced between the electrodes which will follow the path of lowest resistance defined by the areola of thin films 5 lying on the credit card B facing the head A and will cause the destruction of said areola 5. On the contrary, in case the identity card is to be used for entering or circulating within protected rooms or areas, cancellation is not necessary and will not be achieved. In such a case the cancellation electrodes 3, 4 will not be switched on or will be omitted in the device according to the present invention.

At 6 a foil of material having a high dielectric strength and the smallest possible thickness is formed, and has the function of insulating the excitation and detection windings 1 and 2 from the cancellation electrodes 3 and 4. The material comprising the member 6 must have very good properties of resistance to the high temperatures produced by the electric arc.

In FIG. 2 the block diagram of the reading circuit is shown. It consists of a generator 7 producing the excitation current with frequency $f_0$ which is supplied to the winding 1. The same signal is supplied to a frequency doubler 8 the output of which is the first reference signal. If the head A is faced by an areola 5 contained on the laminar support 20 forming a credit card B (the areola 5 being of material with preset characteristics of uniaxial, magnetic anisotropy), a response signal of frequency $2f_0$ is induced in the winding 2, said signal being suitably filtered in a filter 9 and amplified in the amplifier 10. From the amplifier 10 the signal is supplied to both a phase comparator 11 which compares it with the first reference signal supplied from the frequency doubler 8 and an amplitude comparator 17 which compares the input signal with a reference voltage supplied from the device 18. The outputs of the comparators 11 and 17 are supplied to a binary coder 12 the output of which is representative of the behaviour of the material applied to the areola 5 under examination facing the cross point of the windings 1, 2 which is subjected to the magnetic field produced by the excitation current passing through the winding 1.

When there is no material on the areola 5 under examination the state of the coder 12 is at rest (00). Such state is achieved also in the presence of a material having characteristic of uniaxial, magnetic anisotropy different from those of the material used to provide the authentic credit cards B or the like. In such a case the material exhibits different values with respect to the reference ones.

When there is material having the requested characteristics on the areola 5 the state of the binary coder 12 is (01) or its complement (10) according to the direction of orientation of the magnetic moment vector of the material on the areola 5 concerned.

Another peculiar characteristic of the reading device according to the present invention permits it to carry out a further, restrictive test of the physical characteristics of the film covering the areolae 5 and having uniaxial, magnetic anisotropy by means of an inversion by 180° of the magnetic moment vector during the reading at the end of the first phase of evaluation of the areola response.

In order to provide such an inversion the combination of two induced fields is used which are produced by supplying to the winding 2 a d.c. current of intensity $I_o$ produced by the generator 13 and at the same time to the winding 1 an alternating current of intensity $i_o$ and frequency $f_0$ produced by the generator 7. Such currents are necessary to rotate by 180° the magnetic moment vector in case the material forming the film covering the areola 5 under examination is the requested one.

This inversion does not occur if the material is not the requested one and this is evidence that the credit card or the like B is of different or fraudulent origin.

The head described and illustrated according to the preferred embodiment and formed by the reading probe and the cancellation electrodes may be multiplied by n to read a number of areolae located on a credit card. In particular, the single members of the multiple head can be disposed according to a matrix diagram with "N" lines and "M" columns forming the mirror image of a matrix configuration of the areolae 5 on the credit card.

The number of heads A will be $N \times M$. If it is desired to carry out a reading of the $N \times M$ areolae at the same time, $N \times M$ reading circuits as illustrated in FIG. 2 will be necessary. If the reading is carried out in different times a single system of reading circuits can be used so that it is switched on and connected to each pair of windings 1 and 2.

The number $N \times M$ of excitation windings can be reduced to "N" as a single excitation winding can be used to excite all areolae of a given line. In the same way the number $N \times M$ of detection windings can be reduced to "M" as a single detection winding can be used to detect all areolae of a given column. Of course, by reducing to "N" the excitation windings and to "M" the detection windings the excitation of the single lines can occur only in different times, and it will be possible, therefore, to read at the same time only "M" areolae. Towards this end it is necessary to divide the assembly of excitation and detection circuits illustrated in FIG. 2 in a sub-assembly of circuit means of only excitation comprising the generator 7 and in a sub-assembly of circuit means of only detection comprising the devices (8, 13, 9, 10, 11, 17, 18 and 12).

Thus "N" excitation sub-assemblies connected to "N" excitation windings and "M" detection sub-assemblies connected to "M" detection windings can be used. Alternatively a single sub-assembly of excitation circuit means, which will be connected to the "N" excitation windings, and a single sub-assembly of detection circuit means, which will be connected to the "M" detection windings, can be used. In such a case it will be possible to read only one areola at a time.

A different configuration includes a multiple head with $m \times n$ reading and cancellation units (where $m < M$ and $n < N$). In such a case it is possible to read a subassembly consisting of $m \times n$ areolae belonging to the assembly of $M \times N$ areolae on the credit card. By moving the multiple head to a new area of the credit card it is possible to read a new sub-assembly of $m \times n$ areolae and to complete the reading of the whole assembly of $M \times N$ areolae by subsequent movements.

What is claimed is:

1. Device for reading and, if required, cancelling credit cards, identity cards or the like formed by a laminar material (20) on which areolae (5) covered by a thin film of a material having specific characteristics of uniaxial, magnetic anisotropy are provided, characterized by:

(i) at least a head (A) consisting of: (a) at least a reading probe comprising a support member (14) having a flat surface (14a) and provided with at least an assembly consisting of an exitation winding (1) associated to a detection winding (2), both windings being wound around said support (14) according to an orthogonal relationship, said probe being mounted in such a way that the intersection point between said windings (1, 2) on the surface (14a) of the support member (14) is facing the areola (5) of the material with uniaxial, magnetic anisotropy to be subjected to an examination; and (b) a pair of cancellation electrodes (3, 4) connected to a supply circuit (21) comprising a control switch (22) and mounted at the intersection point of the windings (1 and 2) but spaced apart from the latter by means of a laminar, electrically and thermically insulating, shielding member (6) and adjusted so as to permit the arcing through the areola (5) to be cancelled; and (ii) circuit means for generating an excitation current in the winding (1) and to receive the response signal induced in the winding (2) from the material to be examined in order to check the properties of uniaxial, magnetic anisotropy thereof by means of a comparison of the amplitude and the phase of such a response signal with a reference signal as well as by means of the detection of the eventual rotation by 180° of the magnetic moment vector through the application to the areola (5) under examination of orthogonal magnetic fields produced by supplying to the detection winding (2) a d.c. current of predetermined intensity $I_o$ and to the winding (1) an alternating current of frequency $f_o$ and intensity $i_o$, which are predetermined as a function of the characteristics of the material forming the film of the areola (5).

2. Device according to claim 1, wherein in the flat surface (14a) of the support member (14) two orthogonal slots (15a, 15b) are provided to house the respective windings (1, 2), while the electrodes (3, 4) are mounted above the intersection point of said windings in equally spaced relationship from the axis X—X passing through said intersection point perpendicularly to the plane of the surface (14a), said axis passing essentially through the centre of the areola (5) under examination when the device is operating and being essentially perpendicular to the plane of the laminar support member (20) of the credit card (B) or the like so that said arc passes through the areola (5) to be cancelled.

3. Device according to claim 1, characterized by the fact that said circuit means comprise: a generator (7) of the excitation current, the output of which is connected to the excitation winding (1) and a frequency doubler (8); filtering means (9) and amplifier means (10) for the signal which is induced when the device is operating in the winding (2) by the material having uniaxial, magnetic anisotropy and forming the areola (5) under examination; a phase comparator (11) receiving the output signal of the frequency doubler (8) and comparing it with the signal which is induced, filtered and amplified, and an amplitude comparator (17) comparing said signal induced, filtered and amplified with a reference signal supplied by a voltage generator (18); a binary coder (12) receiving the signals supplied by the phase comparator (11) and the amplitude comparator (17) and indicating by its state the presence or the absence in the areola (5) of the material having the predetermined characteristics of uniaxial, magnetic anisotropy; a generator (13) of d.c. current having a predetermined intensity $I_o$ and supplied to the detection winding (2), in which also alternating current of intensity $i_o$ and frequency $f_o$ is induced by the generator (7).

4. A device according to claim 1, characterized by the fact that it comprises a plurality of heads (A) assembled according to a matrix diagram with "N" rows and "M" columns located so as to form the mirror image of the assembly of all areolae (5) on the credit card or the like, the reading being effected at the same time when a plurality of N×M excitation and detection circuit means is provided or successively when a single system of excitation and detection means to be connected to the probe of the single heads is used.

5. Device according to claim 4 wherein said heads comprise N×M reading probes which are formed by N excitation windings and M detection windings applied on a single support member and mounted according to a matrix diagram so that their intersection points form the mirror image of the assembly of the areolae (5) on the credit card or the like, the reading being effected at the same time for all areolae (5) of a row by the N sub-assemblies of excitation circuit means, each consisting of a generator (7), and by the M sub-assemblies of detection circuit means consisting of the devices (8, 13, 9, 10, 11, 17, 18 and 12).

6. Device according to claim 5, wherein the plurality of probes comprising N excitation windings and M detection windings are associated to a single sub-assembly of excitation circuit means consisting of the device (7) and a single sub-assembly of detection circuit means consisting of the devices (8, 13, 9, 11, 17, 18 and 12), said sub-assembly of excitation circuit means (7) being connected successively to any of N excitation windings, and said sub-assembly of detection circuit means (8, 13, 9, 11, 17, 18 and 12) being connected successively to any of M detection windings, thus providing a reading of the areolae (5) according to a succession in the time.

7. Device according to claim 1, wherein the device comprises a plurality of heads assembled according to a matrix with n rows and m columns, the probes of which are formed by n excitation windings, where n<N, and by m detection windings, where m<M, which windings are located so as to form the mirror image of a sub-assembly of areolae (5) on the credit card or the like, which are deposited on a laminar support member (20) according to a matrix diagram having N rows and M columns, means being provided to move the device for the successive reading of each sub-assembly of areolae (5).

8. Reading device according to claim 1, wherein it comprises: at least a simplified head consisting of the sole reading probe/s: and excitation and detection circuit means to test the characteristics of the signal induced in the material of the areola (5) under examination to be used if no cancellation is requested.

* * * * *

UNITED STATES PATENT AND TRADEMARK OFFICE
CERTIFICATE OF CORRECTION

PATENT NO. : 4,672,183

DATED : June 9, 1987

INVENTOR(S) : PAOLO DE FEO

It is certified that error appears in the above-identified patent and that said Letters Patent is hereby corrected as shown below:

Face of Patent, Column 1, after "(22) Filed: Oct. 22, 1984"

insert --Foreign Appln. Priority - October 21, 1983 Italy

49205-A/83--

Signed and Sealed this

Thirteenth Day of October, 1987

*Attest:*

DONALD J. QUIGG

*Attesting Officer*  *Commissioner of Patents and Trademarks*